US006964222B1

(12) United States Patent
Tucker

(10) Patent No.: US 6,964,222 B1
(45) Date of Patent: Nov. 15, 2005

(54) TEA BREW BASKET

(76) Inventor: George H. Tucker, 2004 SW. 84th Ter., N. Lauderdale, FL (US) 33068

( * ) Notice: Subject to any disclaimer, the term of this patent is extended or adjusted under 35 U.S.C. 154(b) by 0 days.

(21) Appl. No.: 10/926,377

(22) Filed: Aug. 25, 2004

(51) Int. Cl.[7] .............................................. A47J 31/00
(52) U.S. Cl. ............................ 99/281; 99/284; 99/299; 99/304; 99/306; 99/307; 99/316; 99/323
(58) Field of Search ......................... 99/495, 279–285, 99/287, 288, 289 R, 290, 295, 304–307, 99/299, 308, 309, 311, 316, 317, 323, 297; 210/464, 477, 479, 473, 474, 481; 219/483, 219/482; 426/433, 432, 429

(56) References Cited

U.S. PATENT DOCUMENTS

| 1,646,022 | A | 10/1927 | Hagel | |
| 3,132,580 | A | 5/1964 | Walker | 99/282 |
| 3,280,721 | A | 10/1966 | Walker | 99/282 |
| 4,683,812 | A | 8/1987 | Tarlow et al. | 99/289 |
| 4,888,466 | A | 12/1989 | Hoffmann | 219/301 |
| 5,188,019 | A | 2/1993 | Vahabpour | 99/285 |
| 5,570,623 | A | * | 11/1996 | Lin | 99/285 |
| 6,142,063 | A | 11/2000 | Beaulieu et al. | 99/283 |
| 6,283,013 | B1 | 9/2001 | Romandy et al. | 99/322 |
| 6,612,224 | B2 | * | 9/2003 | Mercier et al. | 99/282 |
| 2002/0121197 | A1 | 9/2002 | Mercier et al. | 99/279 |

* cited by examiner

Primary Examiner—Timothy F. Simone
(74) Attorney, Agent, or Firm—Robert C. Kain, Jr.; Fleit Kain

(57) ABSTRACT

The tea brew basket operates in conjunction with a coffee maker. The coffee maker includes a vertical superstructure and an overhanging sub-structure which delivers heated water to a carafe located beneath the sub-structure. The tea brewing system includes a tea brewer basket with a hanger complementary to the basket hanger on the coffee maker, a chute and a tea leaf retaining basket loosely fit within the chute. A controllable latch releases the tea leaf retaining basket from the chute and into the brewer basket. A controller operates a drain valve at the bottom of the brewer basket. Sensors and operator selections control either the brew time, brew temperature or both prior to opening the drain valve.

5 Claims, 4 Drawing Sheets

TEA BREW BASKET

The present invention relates to a tea brewer basket in combination with a coffee maker.

BACKGROUND OF THE INVENTION

Many persons own and use a coffee maker which generally includes a vertical superstructure, an overhanging sub-structure extending therefrom and a basket which hangs from the vertical superstructure (or sometimes from the extending overhanging sub-structure). The basket typically holds ground coffee beans. As is known, this common coffee maker includes a water reservoir, a heater for the water and a removable carafe which rests during the brewing operation beneath the overhanging sub-structure. Heated water is fed through appropriate conduits or transfer channels to the overhanging sub-structure and is channeled into the basket which retains the ground coffee beans. The beans brew in the heated water and coffee is ejected or flows from the lower end of the brew basket into the carafe disposed beneath the basket.

Due to the wide availability of these coffee makers and the growing popularity of hot tea (and sometimes cold tea), it is beneficial to provide a brewing system for tea which may be supplemental to the common coffee maker.

OBJECTS OF THE INVENTION

It is an object of the present invention to provide a tea brew system which operates in conjunction with a common coffee maker.

It is a further object of the present invention to provide a tea brewing system which is a singular unit configured as a tea brewer basket which replaces the common coffee bean retaining basket in the common coffee maker.

It is another object of the present invention to provide a tea brewing system with controls for brew time, in one instance, and in another instance, brewing temperature and, in a third instance, both brew time and brewing temperature.

SUMMARY OF THE INVENTION

The tea brew basket operates in conjunction with a coffee maker. The coffee maker includes a vertical superstructure and an overhanging sub-structure which delivers heated water through the sub-structure into a carafe located beneath the sub-structure. The tea brewing system includes a tea brewer basket with a hanger complementary to the basket hanger on the coffee maker, a chute leading to a drop port in the brewer basket and a tea leaf retaining basket loosely fit within the chute. A controllable latch releases the tea leaf retaining basket from the chute and into the brewer basket. A controller operates a controllable valve at the bottom of the brewer basket. The controller uses sensors and operator selectable control input to control either the brew time, brew temperature or both prior to opening the valve at the bottom of the brewer basket.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

Figure 1:
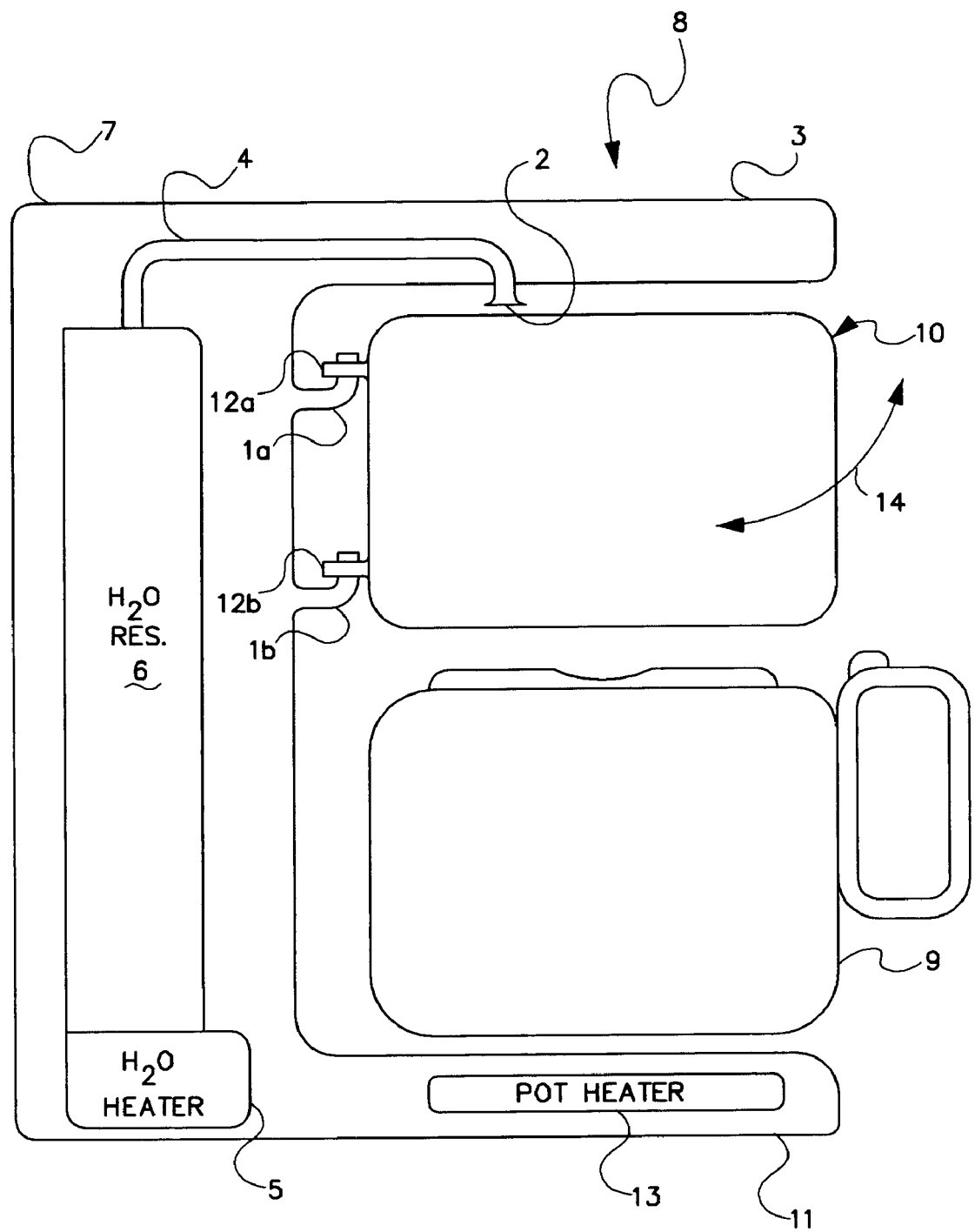
FIG. 1 diagrammatically illustrates the tea brew basket in combination with a common coffee maker.

The present invention relates to tea brew basket in combination with a coffee maker. FIG. 1 diagrammatically illustrates tea brew basket 10 hanging on a common coffee maker 8. Coffee maker 8 includes a vertical superstructure 7, a water reservoir 6 and a water heater 5. As is known, water heater 5 heats the water in water reservoir 6 and the heated water is fed via a conduit, channel or passage 4 to an overhanging sub-structure 3. Water exits port 2 and, in the present invention, enters tea brewer basket 10. In the illustrated embodiment, coffee maker 8 includes basket hangers 1A, 1B. In addition, common coffee maker 8 includes a carafe 9 which retains either coffee or tea (tea in the illustrated embodiment) and is kept warm by a pot heater. In the illustrated embodiment, common coffee maker 8 includes a base 11 within which pot heater 13 is located.

Alternatively, tea brewer basket 10 can be hung on overhanging sub-structure 3 with a tongue and groove attachment mechanism or tabs moving in complementary channels. In the illustrated embodiment, tea brewer basket 10 is hung beneath overhanging sub-structure 3 via complementary basket hangers 12A, 12B. Basket hangers or basket hooks 12A, 12B operate in conjunction with hanger studs 1A, 1B such that tea brewer basket 10 hangs beneath overhanging sub-structure 3 and more importantly heated water outlet 42. In addition, tea basket 10 can be rotated in a generally horizontal plane as shown by arrow 14. This permits the user to load the tea leaf holder into the tea brewer basket 10 as discussed later. Also, brew basket 10 is removable from coffee maker 8.

Similar numerals designate similar items throughout the figures.

Figure 2A:
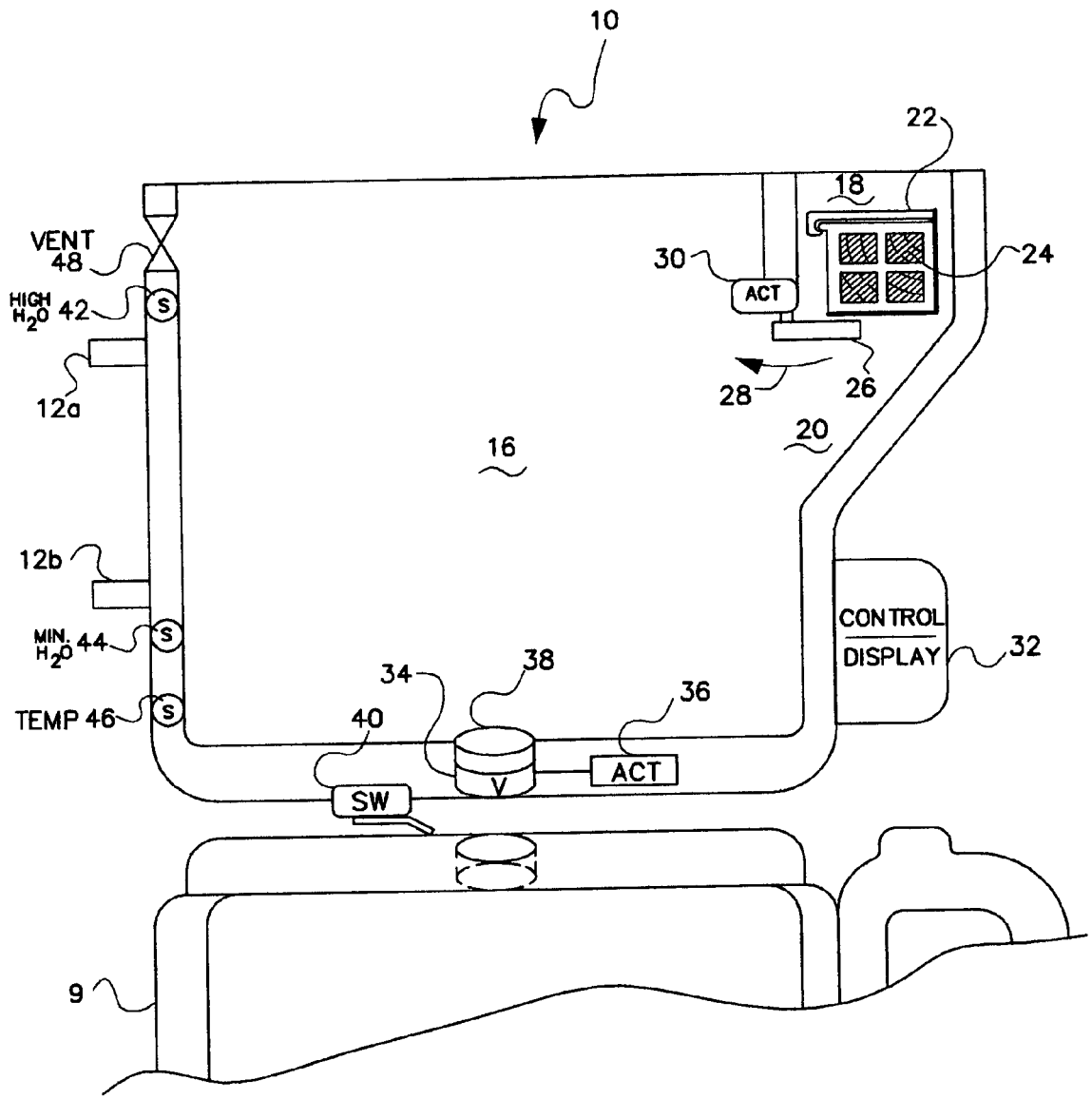
FIG. 2A diagrammatically illustrates the tea brew basket and system in greater detail.
Figure 2B:
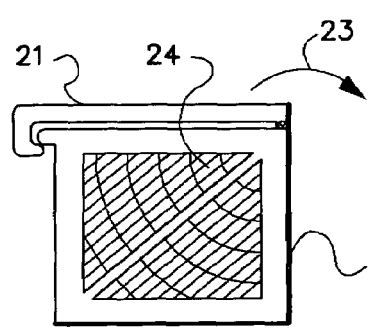
FIG. 2B diagrammatically illustrates a detail of the tea leaf holder or retainer.

FIG. 2 shows a detailed view of tea brewer basket 10. Brewer basket 10 includes an internal area or chamber 16 into which heated water is poured from output port 2 of FIG. 1. Brew basket 10 includes a chute 18 leading to a drop port 20 along one side of tea brewer basket 10. A tea leaf holder 22 is loosely retained in chute 18. Tea leaf holder 22 includes a plurality of screen or mesh areas, one of which is mesh area 24 which permits the tea leaves that are retained in the basket to interact with the water placed in interior 16 of tea brewer basket 10. A detail of tea leaf holder 22 is shown in FIG. 2B. Tea leaf holder 22 is retained in chute 18 via latch 26. Latch 26 is moved as shown by arrow 28 based upon the control of actuator 30. Other mechanisms may be used to release holder 22 into the basket area 16. For example, spring loaded latches, electro-mechanical locks or releases and solenoid or magnetic controls may be used to permit the free release of tea holder 22 into region 16. Gravity causes holder 22 to drop into the hot water. The latch or lock release simply retains the holder in the chute. A flap may be added to close off the chute form the steaming water. Also, rather than holder 22, a weighted tea bag may be used. The weighted tea bag is the equivalent of the holder.

In the illustrated embodiment, tea brewer basket 10 includes a control-display unit 32 which is described later in conjunction with FIG. 3. Unit 32 is both a control and a user display. In general, heated water is retained in interior area 16 of tea brewer basket 10, tea leaf holder 22 is dropped from chute 18 due to the release of latch 26 and the tea leaf holder 22 permits the tea leaves to brew or stew in the heated water. Control-display 32 accepts input from various sensors (described later) and monitors water height and temperature such that at the appropriate time and/or temperature, a valve 34 at the lower end of basket 10 is opened under the control of actuator 36 and the brewed tea is released via lower port 38 into carafe 9. A switch 40 determines the presence or absence of carafe 9.

Control-display 32 accepts input from various sensors such as high water sensor 42, low or minimum water sensor 44 and temperature sensor 46. If the temperature of the water in interior region 16 is too high, control-display 32 opens an air vent 48 permitting the water in area 16 to cool until an appropriate temperature is sensed at temperature sensor 46.

FIG. 2B shows a detail of tea leaf holder 22. Tea leaf holder 22 includes a top lid 21 which swings in a direction shown by arrow 23 thereby permitting the user to load cut tea leaves into the interior of tea leaf holder 22. As shown in FIG. 2B, the flow through mesh area, one of which is mesh area 24, can be a different configuration than that shown in FIG. 2A. After tea leaves are loaded into the interior of tea leaf holder 22, lid 21 is closed with a suitable attachment means. A nib and an indent is shown in FIG. 2B. Other tea leaf holder designs could be utilized as long as the tea leaf holder slides within and leaves chute 18 when latch 26 is withdrawn. Other release mechanisms may be used to release holder 22 from chute 18.

Figure 3:
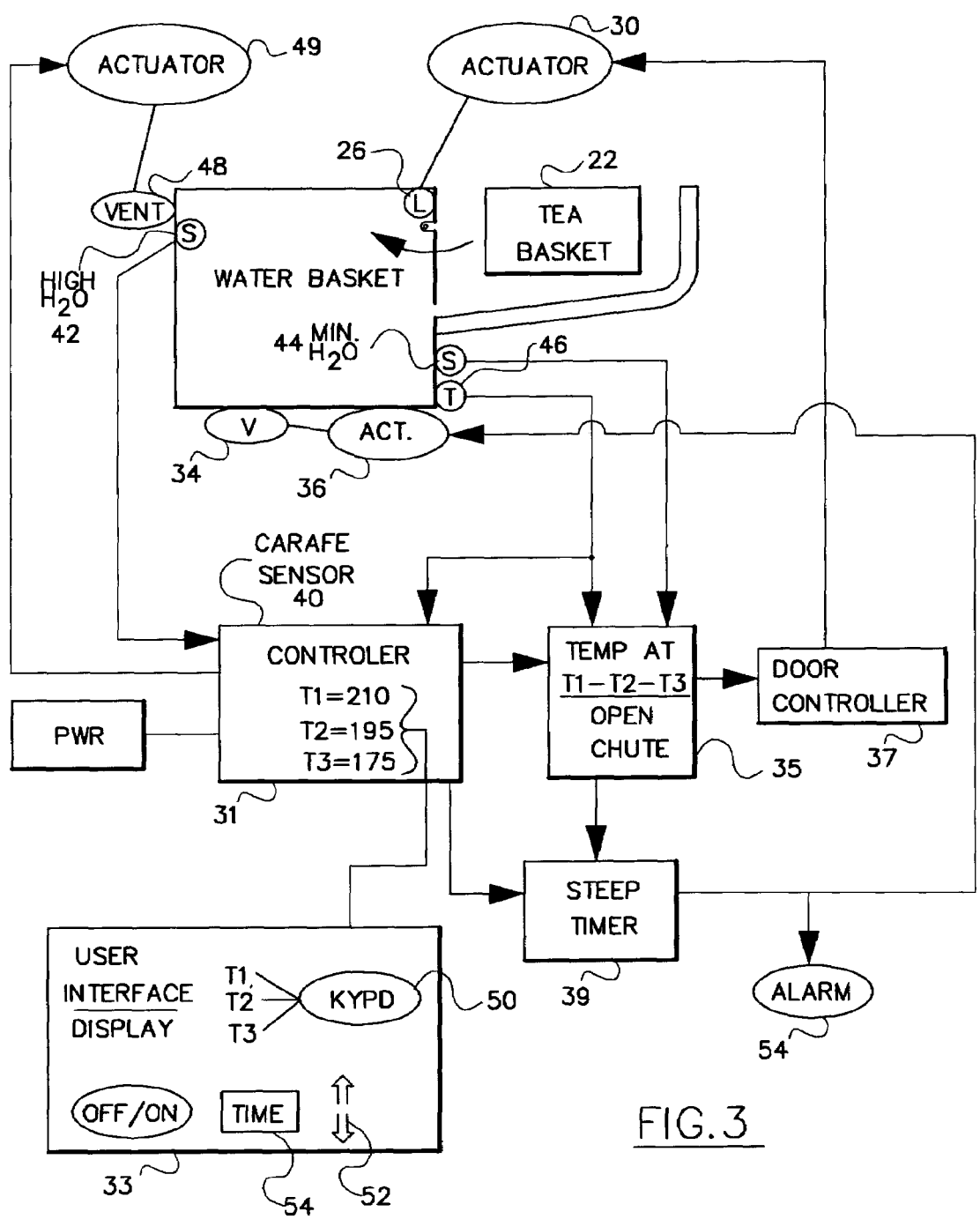
FIG. 3 diagrammatically illustrates a schematic of the tea brew system and particularly the electronic controls therefor.

FIG. 3 diagrammatically illustrates the electrical system for the tea brewer basket. Controller 31 receives inputs from high water sensor 42. Controller 31 also receives input from user interface-display 33. In general, FIG. 3 shows functional block units for the control system. The user interface-display 33 includes a global or system ON/OFF control and permits the user in the illustrated embodiment to select the type of tea being brewed. For example, green tea is typically brewed at 175 degrees F., Ollong is tea brewed at 195 degrees and black tea or herb tea is brewed at 210 degrees. Typically, hot water from a coffee brewer is fed into the coffee brew basket at 205 degrees F.

There are three principle issues relating to the brewing of tea. One issue is the temperature at which the tea is brewed. Another issue is the amount of time the tea leaves steep in the hot water. A third issue is that tea leaves typically float. The utilization of a tea leaf holder that is heavier than water eliminates one of these problems. Since the user selects via keypad 50 either the temperature or the type of tea (the controller may identify temperature or the tea selection or both), the controller 31 identifies the pre-programmed steep time for each different tea. Times are stored in memory. The user, by operating up or down arrow 52, can increase or decrease the time. A time display 54 is also provided to the user. Arrow 52 can also select tea type (a scroll menu selector).

Controller 31 then determines the temperature via sensor and the amount of time necessary to brew the tea in the hot water dispensed into region 16 of the tea brewer basket. Control unit 35 accepts as input an indication of temperature from temperature sensor 46 as well as input from minimum water level sensor 44. In other words, there must be a minimum amount of water in the water basket area 16 in order to brew the smallest amount of tea. Control unit 35, which accepts a temperature signal from controller 31 (ultimately selected by the user in user interface/display 33) compares when (1) the minimum water sensor 44 is detecting sufficient water and (2) when temperature sensor 46 meets or exceeds the designated temperature set by controller unit 31. If a large amount of tea is to be brewed, controller 31 can be set to detect when high water level sensor 42 is ON, that is, to sense the presence of significant water in water basket 16. If the temperature detected by temperature sensor 46 exceeds the designated temperatures $T_1$ through $T_3$, control unit 31 opens air vent 48 by a command sent to actuator 49. Air vent 48 simply vents cooler air into water basket area 16 thereby cooling the hot water. When temperature sensor 46 reaches the appropriate temperature (or a designated range about the appropriate temperature), air vent 48 is closed by activating actuator 49.

Dependent upon minimum water sensor 44 and temperature sensor 46, control unit 35 gives an OPEN CHUTE command to door latch controller 37. Door controller 37 modifies or conditions the signal from controller units 31, 35 and activates latch activator 30. Latch 26 swings away from drop port 20 (FIG. 2A) and tea leaf holder 22 drops through chute 18 and out of port 20 into the hot water retained in water basket area 16. At that time, controller 31, and to some degree controller 35, activates steep timer 39. Steep timer 39 determines when the appropriate time has passed after OPEN CHUTE to steep the tea in the hot water in water basket region 16. When the tea is sufficiently steeped, steep timer times out, and alarm 54 is turned ON (audio or visual or both) and the steep timer issues a command to valve actuator 36 which opens lower valve 34 in the bottom of water basket 16. Hot tea then drains from water basket region 16 due to the open valve 34. Of course, controller 31 also accepts a control input from carafe sensor 40 in order to ensure that carafe 9 is beneath the tea brewer basket. In a further development of the present invention, if the region in water basket area 16 is too small for the amount of tea requested by the user, the control system can be modified and the user interface/display can be modified such that a highly concentrated amount of tea is steeped in water basket region 16, then valve 34 is opened which drains the concentrated tea into the carafe while the coffee maker continues to pour heated water into the water basket area 16. In this operational setting, high water sensor 42 operates as an interim control to sense when the water reaches that high level. In other words, high water level sensor 42 is both a safety sensor as well as a control sensor in that when water reaches high water level 42, valve 34 is opened thereby draining the water basket area 16 of concentrated tea. The control parameters in control unit 35 and steep timer 39 would have to be reset in this enhanced operation version of the tea brewer system.

Figure 4:
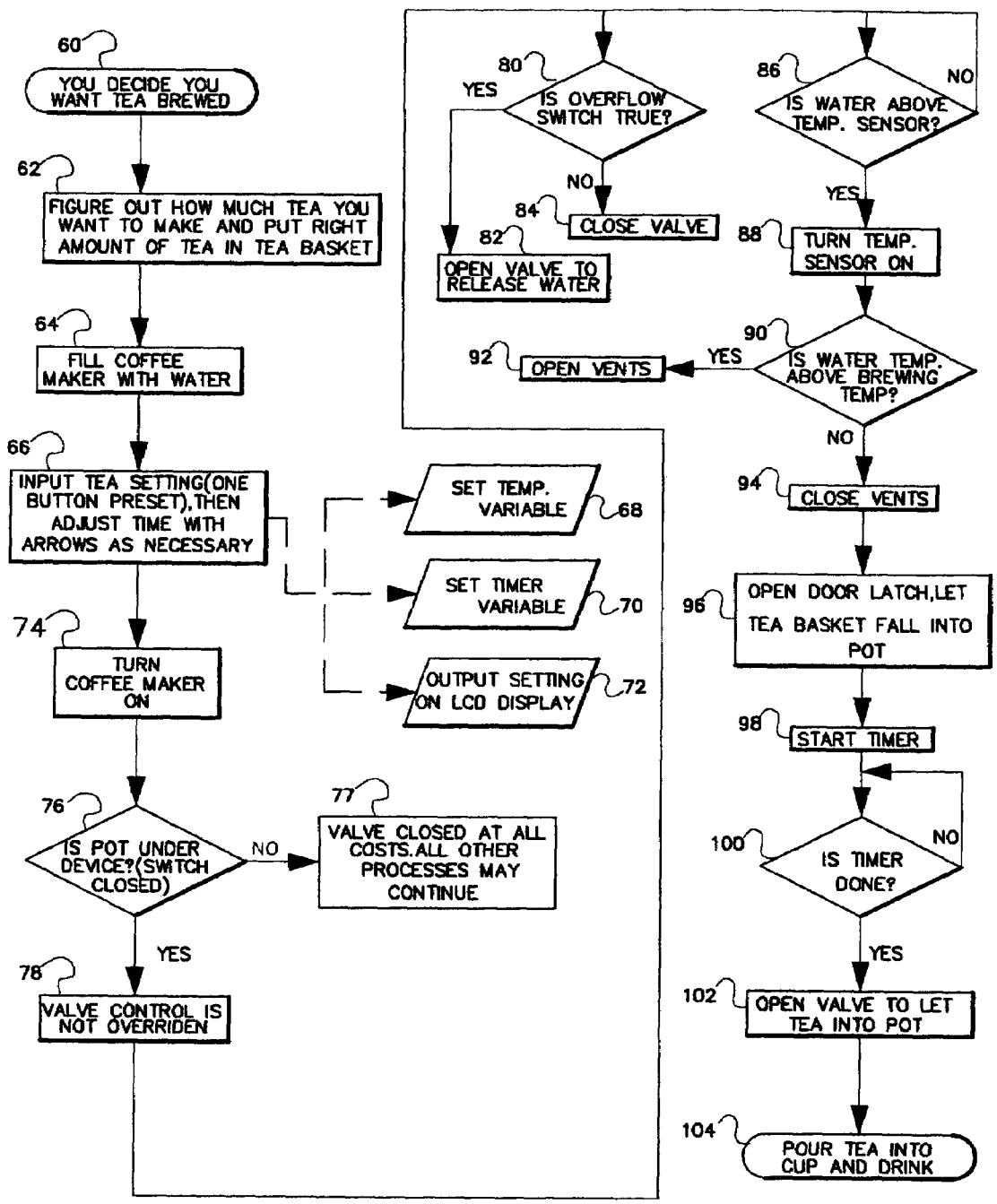
FIG. 4 diagrammatically illustrates a flow chart showing the operation of the controller of the tea brew basket.

FIG. 4 diagrammatically illustrates a flow chart showing the operation of the tea brewer system. Step 60 permits the user to decide what type of tea the user would like to brew. Step 62 indicates that the user must select the appropriate amount of tea leaves to be put in the tea leaf holder. Step 64 indicates that the user must fill the common coffee maker with water. Step 66 indicates that the user selects the type of tea setting either time or type of tea as discussed earlier. The user can also adjust the steep time as discussed above in connection with FIG. 3. The controller (a combination of controller unit 31, 35, 37 and 39) sets the temperature in step 68, sets the timer in step 70 and outputs the appropriate setting indicator on the display unit in step 72. Of course, the user interface/display 33 could include an LCD screen which would neatly display time at one instance and then type of tea at another instance or any other information that assists the user in operating the tea brewer system.

After step 66, the user turns the coffee maker ON in step 74.

In step 76, the controller determines whether the carafe sensor 40 determines the presence of the carafe beneath tea brew basket 10. If not, the system branches via the NO branch to step 77 which issues a control command to assure that valve 34 is closed. If the YES is taken from step 76, step 78 does not override the valve control sub-system. After step 78, the system enters decision step 80 which determines whether the overflow or high water switch or sensor 42 is TRUE or senses the presence of high water in water basket region 16. If YES, the system executes step 82 which opens valve 34 to release water in water basket region 16. If NO, step 84 again issues a command to CLOSE lower valve 34 in the tea brew basket system. Concurrent with decision step 80 (overflow switch TRUE), the system activates decision step 86 which determines whether the water is above the low water or minimum water level based upon the output of sensor 44. If NO, the program repeats to execute decision steps 80, 86. If YES, the system in step 88 turns the temperature sensor 460N. In step 90, a decision is made whether the water temperature is above the brewing temperature. The brewing time and/or temperature was selected by the user or by the pre-programmed routine in steps 66, 68, 70 and 72. If YES, the program executes step 92 which opens air vent 48 to cool the water in water basket region 16. If NO, the system in step 94 closes vent 48 by triggering actuator 49. In step 96, the door latch 26 is opened permitting tea leaf holder 22 to fall down chute 18 and out of port 20. In step 98, the brew timer is activated which monitors the steeping time of the tea leaves in the hot water retained by water basket region 16. Decision step 100 determines whether the brew timer has timed out. If YES, step 102 opens valve 34 and dispenses the brewed tea into carafe 9. Step 104 relates to the user utilizing carafe 9 to pour tea into a tea cup. If the timer in decision step 100 has not timed out, the system loops to a point immediately preceding decision step 100.

It is important to note that the electrical system discussed in FIG. 3 identifies functional elements and many of these elements can be combined into one or more integrated circuits or specially configured circuitry. In other words, FIG. 3 is a functional diagram and many of the functions can be combined into one or more pieces of electronic hardware. Further, the actuators may be integrally associated with the vents and latches and valves. In addition, the routine set forth in FIG. 4 is only exemplary in nature. There may be better and more efficient techniques to accomplish the objectives of the present invention. The tea basket may also carry batteries to power the electronics and electro-mechanical controls. Other power supply systems may be utilized such as tapping power from the coffee maker power cord. In a further enhancement, the controls and display may be located someplace other than on the tea basket. However, the preferred embodiment is a singular unit with the controls mounted on the basket.

The claims appended hereto are meant to cover modifications and changes within the scope and spirit of the present invention.

What is claimed is:

1. A tea brew basket, in combination with a coffee maker, the coffee maker including a vertical superstructure with an overhanging sub-structure extending therefrom, water reservoir in the superstructure, a heating unit for said water, a removable carafe to hold a beverage retained beneath said overhanging sub-structure, and a water conduit for transferring heated water from said reservoir through said overhanging sub-structure to said carafe, and a basket hanger on one of said superstructure and said sub-structure, said tea brewer comprising:

a tea brewer basket with a basket hanger complementary to said basket hanger on said coffee maker, said tea brewer basket adapted to be hung beneath said overhanging sub-structure to receive said heated water;

a chute leading to a drop port on said tea brewer basket;

a tea leaf holder shaped to fit in said chute, said tea leaf holder adapted to retain tea leaves therein;

a controllable latch to release said tea leaf holder from said chute and out said drop port and into said tea brewer basket;

a controllable valve at the bottom of said tea brewer basket for controlling water flow therefrom to said carafe adapted to be disposed beneath said tea brewer basket;

a high water sensor and a low water sensor to detect water levels in said tea brewer basket;

a temperature sensor proximate said low water sensor;

a controllable air vent near a top of said tea brewer basket to vent air therefrom;

a user actuatable control to select one or more controls from the group of controls including brew time and brew temperature; and a controller means, coupled to said user actuable control, said high and low water sensors, said temperature sensor, said controllable valve and said controllable latch, for monitoring water level and temperature, actuating said latch resulting in the dropping of said tea leaf holder into said tea brew basket and actuating said valve after temperature and time meet said controls.

2. A tea brew basket, in combination with a coffee maker, as claimed in claim 1 wherein said controller includes means for controlling said air vent and venting air when the temperature of said heated water exceeds said brew temperature control.

3. A tea brew basket, in combination with a coffee maker, the coffee maker including a vertical superstructure with an overhanging sub-structure extending therefrom, water reservoir in the superstructure, a heating unit for said water, a removable carafe to hold a beverage retained beneath said overhanging sub-structure, and a water conduit for transferring heated water from said reservoir through said overhanging sub-structure to said carafe, and a basket hanger on one of said superstructure and said sub-structure, said tea brewer comprising:

a tea brewer basket with a basket hanger complementary to said basket hanger on said coffee maker, said tea brewer basket adapted to be hung beneath said overhanging sub-structure to receive said heated water;

a chute leading to a drop port on said tea brewer basket;

a tea leaf holder shaped to fit in said chute, said tea leaf holder adapted to retain tea leaves therein;

a controllable latch to release said tea leaf holder from said chute and out said drop port and into said tea brewer basket;

a controllable valve at the bottom of said tea brewer basket for controlling water flow therefrom to said carafe adapted to be disposed beneath said tea brewer basket;

a user actuatable control to select one of a plurality of brew time controls; and a controller means, coupled to said user actuable control, said controllable valve and said controllable latch, for actuating said latch resulting in the dropping of said tea leaf holder into said tea brew basket and actuating said valve after expiration of the selected brew time control.

4. A tea brew basket, in combination with a coffee maker, the coffee maker including a vertical superstructure with an overhanging sub-structure extending therefrom, water reservoir in the superstructure, a heating unit for said water, a removable carafe to hold a beverage retained beneath said overhanging sub-structure, and a water conduit for transferring heated water from said reservoir through said overhanging sub-structure to said carafe, and a basket hanger on one of said superstructure and said sub-structure, said tea brewer comprising:

a tea brewer basket with a basket hanger complementary to said basket hanger on said coffee maker, said tea brewer basket adapted to be hung beneath said overhanging sub-structure to receive said heated water;

a chute leading to a drop port on said tea brewer basket;

a tea leaf holder shaped to fit in said chute, said tea leaf holder adapted to retain tea leaves therein;

a controllable latch to release said tea leaf holder from said chute and out said drop port and into said tea brewer basket;

a controllable valve at the bottom of said tea brewer basket for controlling water flow therefrom to said carafe adapted to be disposed beneath said tea brewer basket;

a temperature sensor proximate said low water sensor;

a controllable air vent near a top of said tea brewer basket to vent air therefrom;

a user actuatable control to select one or more controls from the group of controls including brew time and brew temperature; and a controller means, coupled to said user actuable control, said temperature sensor, said controllable valve and said controllable latch, for monitoring water level and temperature, actuating said latch resulting in the dropping of said tea leaf holder into said tea brew basket and actuating said valve after temperature and time meet said controls.

5. A tea brew basket, in combination with a coffee maker, as claimed in claim 4 wherein said controller includes means for controlling said air vent and venting air when the temperature of said heated water exceeds said brew temperature control.

* * * * *